United States Patent
Chen et al.

(10) Patent No.: US 8,924,342 B2
(45) Date of Patent: Dec. 30, 2014

(54) SYSTEM AND METHOD FOR DATA TRANSFER

(75) Inventors: Lin Chen, Shanghai (CN); Yuming Mao, Shanghai (CN); Xiao Zhuang, Shanghai (CN); Zhijun Lu, Shanghai (CN); Yanming Yang, Shanghai (CN); Mei Bai, Shanghai (CN)

(73) Assignee: China Unionpay Co., Ltd., Shanghai (CN)

( * ) Notice: Subject to any disclaimer, the term of this patent is extended or adjusted under 35 U.S.C. 154(b) by 19 days.

(21) Appl. No.: 13/393,205

(22) PCT Filed: Aug. 24, 2010

(86) PCT No.: PCT/CN2010/001280
§ 371 (c)(1),
(2), (4) Date: May 14, 2012

(87) PCT Pub. No.: WO2011/026311
PCT Pub. Date: Mar. 10, 2011

(65) Prior Publication Data
US 2012/0221536 A1    Aug. 30, 2012

(30) Foreign Application Priority Data

Sep. 2, 2009    (CN) .......................... 2009 1 0195025

(51) Int. Cl.
*G06F 17/30*    (2006.01)
(52) U.S. Cl.
CPC ............................... *G06F 17/30581* (2013.01)

USPC ........................................................ 707/602
(58) Field of Classification Search
USPC ........................................................ 707/602
See application file for complete search history.

(56) References Cited

U.S. PATENT DOCUMENTS

| | | | |
|---|---|---|---|
| 5,706,434 A | 1/1998 | Kremen | |
| 2006/0253685 A1* | 11/2006 | Wong et al. | ...................... 712/25 |
| 2007/0174308 A1 | 7/2007 | Rausch | |
| 2010/0036863 A1* | 2/2010 | Koifman et al. | .............. 707/101 |

FOREIGN PATENT DOCUMENTS

| | | |
|---|---|---|
| CN | 101504664 | 8/2009 |
| WO | WO 00/10083 A2 | 2/2000 |

* cited by examiner

*Primary Examiner* — William Spieler
(74) *Attorney, Agent, or Firm* — Blakely Sokoloff Taylor & Zafman

(57) ABSTRACT

A data transfer system and method are provided in the present invention. Wherein, the data transfer system and method comprises a source data obtaining service module and a target table updating service module, both of which are divided into a main part and an affiliated part, and wherein the affiliated part is a dynamic function library, which can package sub-processings such as source data obtaining, data transformation and data inserting/updating. Meanwhile, the data transfer system and method can support quasi real-time data transfer tasks and real-time data transfer tasks at the same time. The data transfer system and method support multi-computer disaster tolerance and extension, and the customization of the dynamic function library can facilitate the change in the requirements of data transfer.

13 Claims, 4 Drawing Sheets

SYSTEM AND METHOD FOR DATA TRANSFER

This is a non-provisional application claiming the benefit of International Application Number PCT/CN2010/001280 filed Aug. 24, 2010.

TECHNICAL FIELD

The present invention relates to a system and method for transferring data, more particularly, to a system and method for transferring data of multi-platform databases.

BACKGROUND

At present, along with the fact that the application of the database system is continuously increasing and becoming more and more popular, data transfer between a variety of databases is becoming more and more common and important. Moreover, typically, in a single database application system, a plurality of databases based on a variety of platforms are used. Therefore, there is an urgent need for a technology of transferring data smoothly between homogeneous/heterogeneous databases. Commercial databases have some replication capabilities, but they only work in an ideal situation with many limitations, and thus are restricted greatly. Independent data replication software has the architecture of replicating databases in manner of point-to-point, and thus is not able to flexibly implement data transfer between a plurality of homogeneous/heterogeneous databases with complicated topology. Furthermore, there are also data transfer software developed specifically for a certain application system, but it lacks the commonality. In summary, existing technologies for transferring data between databases have the following deficiencies: the cost is high; there exist greater influences on the databases or data tables, and the degree of coupling is high (that is, the data transfer software that is suitable for a certain type, such as type A, of databases or data tables are not suitable for another type, such as type B, of databases or data tables moreover, in some cases, there even exists the need to create triggers on the source database or depend on the support for certain functionality of certain database products, and thus these solutions lack commonality and expansibility; these solutions have a single function, and thus cannot support both quasi real-time transfer mode (that is, minute-level transfer) and real-time transfer mode (that is, second-level transfer) at the same time; it is difficult or even impossible to implement data transfer between heterogeneous databases, that is, it is difficult or even impossible to implement the filtering and transformation of data, and thus the database system has poor disaster tolerance and recovery capabilities.

Furthermore, with the rapid improvement of database technology, all of the large database systems support concurrent operations in order to meet more and more application requirements. Meanwhile, in order to further improve the performance of inserting operation, a lot of database products begin to support batch inserting technology. Existing methods for rapidly inserting a large amount of dynamic data to be inserted into a specified target database can be implemented by one of: (1) saving the dynamic data to be inserted into a database file, and then the data are imported in batches by means of database backup or by the loading means provided by the database; (2) by means of a number of concurrent processes, inserting the data into the database with the use of a plurality of links; (3) inserting the data in batches, that is, submitting multiple pieces of data at a time. However, each of the methods abovementioned has its own drawbacks as follows: in method (1), additional disk space is needed, and when the file is saved, the input/output operations are time consuming; in method (2), although a number of processes are executed concurrently, each of the processes submits only one record at a time, and thus the efficiency is low; in method (3), if a large amount of data is submitted at the same time, a large log space will be required, and if the submitting fails, the entire failing caused by this may occur. Therefore, there is also an urgent commercial need for a batch inserting technology that can maximize the performance of the databases.

SUMMARY

To overcome the deficiencies in the prior art solutions as described above, in the present invention, a data transfer system and method for transferring data between databases (including homogeneous and heterogeneous databases) are provided, and the data transfer system and method support both quasi real-time (i.e., minute-level) and real-time (i.e., second-level) data transfer mode.

The objects of the present invention can be realized by the following technical solutions:

A data transfer system comprises at least one host, at least one source databases, at least one target databases, a parameter configuration database and a control database, wherein the parameter configuration database is connected to the at least one host, and is used to store configuration parameters and provides the configuration parameters to the at least one host in response to a request received from the at least one host. The control database is connected to the at least one host and is used to store control information and provides the control information to the at least one host in response to a request received from the at least one host; each of the at least one source databases is connected to the at least one host respectively and is used to provide source data to be transferred; each of the at least one target databases is connected to the at least one host respectively and is used to receive target data to be transferred; and each of the hosts comprises a general control module, a source data obtaining service module, a target table updating service module, wherein the general control module is used to generally control transfer tasks and load the configuration parameters; and it is characterized in that the source data obtaining service module receives the invoking of the general control module to obtain the source data, generate target data and invoke the target table updating service module, wherein the source data obtaining service module is divided into a main part and an affiliated part, wherein the main part is used to read the parameters of the transfer tasks, load the affiliated part, and invoke the sub-processing corresponding to the transfer tasks, and wherein the affiliated part is a dynamic function library which packages source data obtaining sub-processing and data transformation sub-processing.

In the solutions disclosed above, preferably, the target table updating service module receives the invoking of the source data retrieving service module and then inserts or updates the target data into the target table, and the target table updating service module is divided into a main part and a affiliated part, wherein the main part is used to read the parameters of the transfer tasks, load the affiliated part, and invoke the sub-processing corresponding to the transfer tasks, and wherein the affiliated part is a dynamic function library which packages the target data inserting sub-processing and target data updating sub-processing.

In the solutions disclosed above, preferably, the general control module is a minute-level transfer general control module or a second-level transfer general control module, wherein the minute-level transfer general control module is used to carry out quasi real-time data transfer tasks, and the second-level transfer general control module is used to carry out real-time data transfer tasks.

In the solutions disclosed above, preferably, the target table updating service module further comprises a batch database updating sub-module, which performs the inserting and/or updating processes as follows:

(C1) dividing the data to be inserted into blocks, and each block being able to store a plurality of pieces of data;

(C2) each of a plurality of database operation processes reading one block of data at a time in an exclusive manner, and then inserting or updating the data into the target database with the use of batch inserting or batch updating;

(C3) if step (C2) succeeds, then the processes being able to sequentially process other blocks of data, and if step (C2) fails, then inserting or updating the data into the target database in the manner of single inserting or updating, and then recording an error log corresponding to the failure of the operation and continuing to process other blocks of data.

In the solutions disclosed above, preferably, the general control module is deployed in each of the hosts, wherein only one of the at least one hosts has task scheduling capability.

In the solutions disclosed above, preferably, the source data obtaining service module comprises a transformation sub-module which carry out the transformation processing of the source data by invoking a dynamic transformation function, thereby generating the target data.

In the solutions disclosed above, preferably, the at least one source databases and the at least one target databases are heterogeneous.

In the solutions disclosed above, preferably, the parameter configuration database and the control database co-exist in the same database.

The objects of the present invention can be realized by the following technical solutions:

A data transfer method comprises the following steps:

(D1) initializing a general control module in at least one hosts, and reading transfer control information and parameter configuration information;

(D2) initializing a source data obtaining service module and a target table updating service module in the at least one hosts, and wherein the target table updating service module creates a data storage area;

(D3) the general control module invoking the source data obtaining service module according to the transfer control information and the parameter configuration information which are read out, and communicating the transfer task parameters to the source data obtaining service module;

(D4) the source data obtaining service module being connected to at least one source databases so as to obtain the environment variables of the at least one source databases, and to read the corresponding database records in the source databases according to the transfer task parameters;

(D5) the source data obtaining service module transforming the database records that have been read so as to obtain a target record, and writing the target record into the data storage area;

(D6) repeating steps (D4)-(D5) until the storage area has been filled up;

(D7) after the data storage area has been filled up, the source data obtaining service module invoking the target table updating service module, and communicating the transfer task parameters to the target table updating service module;

(D8) the target table updating service module being connected to the at least one target databases and the data storage area so as to obtain the environment variables of the at least one target databases, and to analyze the received transfer task parameters;

(D9) the target table updating service module performing batch inserting and updating of the at least one target databases according to the result of the analyze until the transfer task is completed;

(D10) after the transfer task is completed, the target table updating service module releasing the data storage area;

It is characterized in that, the source data obtaining service module receives the invoking of the general control module to obtain the source data, generate target data and invoke the target table updating service module, wherein the source data obtaining service module is divided into a main part and an affiliated part, wherein the main part is used to read the parameters of the transfer tasks, load the affiliated part, and invoke the sub-processing corresponding to the transfer tasks, and wherein the affiliated part is a dynamic function library which packages source data obtaining sub-processing and data transformation sub-processing.

In the solutions disclosed above, preferably, the target table updating service module receives the invoking of the source data obtaining service module and then inserts or updates the target data into the target table, and the target table updating service module is divided into a main part and a affiliated part, wherein the main part is used to read the parameters of the transfer tasks, load the affiliated part, and invoke the sub-processing corresponding to the transfer tasks, and wherein the affiliated part is a dynamic function library which packages the target data inserting sub-processing and target data updating sub-processing.

In the solutions disclosed above, preferably, the step (D9) of the data transfer method further comprises the following steps:

(E1) dividing the data to be inserted into blocks, and each block being able to store a plurality of pieces of data;

(E2) each of a plurality of database operation processes reading one block of data at a time in an exclusive manner, and then inserting or updating the data into the at least one target databases with the use of batch inserting or batch updating;

(E3) if step (E2) succeeds, then the processes being able to sequentially process other blocks of data, and if step (E2) fails, then inserting or updating the data into the target database in the manner of single inserting or updating, and recording an error log corresponding to the failure of the operation and continuing to process other blocks of data.

In the solutions disclosed above, preferably, the general control module is a minute-level transfer general control module or a second-level transfer general control module, wherein the minute-level transfer general control module is used to carry out quasi real-time data transfer tasks, and the second-level transfer general control module is used to carry out real-time data transfer tasks.

In the solutions disclosed above, preferably, the general control module is deployed in each of the hosts, wherein only one of the at least one hosts has task scheduling capability.

In the solutions disclosed above, preferably, the source data obtaining service module comprises a transformation sub-module which carry out the transformation processing of the source data by invoking a dynamic transformation function, thereby generating the target data.

In the solutions disclosed above, preferably, the at least one source databases and the at least one target databases are heterogeneous.

The advantages of the data transfer system and method disclosed in the present invention are as follows: the data transfer system and method disclosed in the present invention have a low complexity and a high flexibility (i.e. various kinds of data transfer tasks can be carried out) due to the use of a dynamic function library to package the source data selecting process and data transformation process, that is, data transfer between homogeneous/heterogeneous databases can be achieved; moreover, the data transfer system and method disclosed in the present invention can support two modes of data transfer, quasi real-time transfer (i.e., minute-level transfer) and real-time transfer (i.e., second-level transfer), at the same time; furthermore, due to the combination of parallel processing and batch operation during the process of data inserting and updating, the performance of the databases can be maximized. In summary, the data transfer system and method as disclosed in the present invention is a universal, flexible, highly-integrated and highly-stable method and system.

BRIEF DESCRIPTION OF THE DRAWINGS

The technical features and advantages of the present invention will be better understood by one skilled in the art in connection with the drawings, in which.

DETAILED DESCRIPTION

Figure 1:
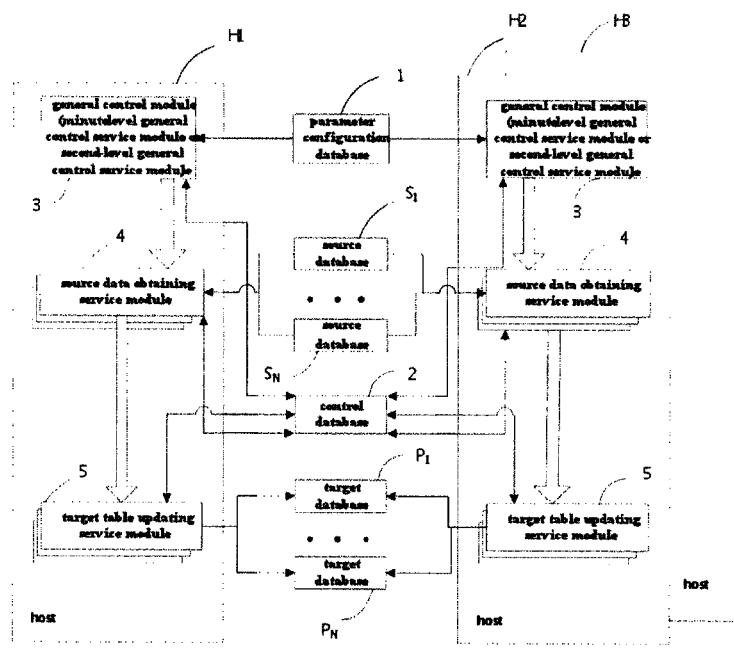
FIG. 1 is the structure view of a data transfer system according to the embodiment of the present invention.

FIG. 1 is the structure view of the data transfer system according to the embodiment of the present invention. As shown in FIG. 1, the data transfer system disclosed by the present invention includes at least one host $H_1$, preferably a plurality of hosts $H_1$-$H_3$ (i.e. the severs); at least one source database $S_1$, preferably a plurality of source databases $S_1$-$S_N$; at least one target databases $P_1$, preferably a plurality of target databases $P_1$-$P_N$; a parameter configuration database 1 and a control database 2. Wherein, the parameter configuration database 1 is connected to the hosts $H_1$-$H_3$, and is used to store configuration parameters and provide the configuration parameters to the hosts $H_1$-$H_3$ in response to the request received from the hosts $H_1$-$H_3$. The control database 2 is connected to the hosts $H_1$-$H_3$, and is used to store control information (i.e., data transfer program parameters and dynamic transfer information) and provide the control information to the hosts $H_1$-$H_3$ in response to the request received from the hosts $H_1$-$H_3$, such that even if the transfer process encounters exceptions and breaks, all control information can still be obtained from the control database 2 to continue the transfer process when the hosts restart, thus the integrity and reliability of the data can be ensured. The source databases $S_1$-$S_N$ are connected to the hosts $H_1$-$H_3$ respectively, and are used to provide source data to be transferred. The target databases $P_1$-$P_N$ are connected to the hosts $H_1$-$H_3$ respectively, and are used to receive the target data to be transferred. Optionally, the parameter configuration database 1 and the control database 2 may co-exist in the same database.

As shown in FIG. 1, each of the hosts $H_1$-$H_3$ includes a general control module 3 (a minute-level general control module or a second-level general control module), a source data obtaining service module 4 and a target table updating service module 5. Wherein, the general control module 3 is used for generally controlling the tasks and loading the configuration parameters into the memory. That is, the minute-level general control module and the second-level general control module are deployed separately such that when a minute-level transfer service is needed, the minute-level general control module is started, and when a second-level transfer service is needed, the second-level general control module is started.

As shown in FIG. 1, each of the hosts has one general control module 3, however, by controlling the parameters, in the host group, only one host will have the functionality of scheduling tasks. Therefore, once exception occurs in the host that have the functionality of scheduling tasks, the functionality of scheduling tasks of the general control module can be enabled in another backup host. In this way, the source data obtaining service module 4 and the target table updating service module 5 in each of the hosts are in the working state, thus the performance and disaster tolerance capability of the system are improved.

As shown in FIG. 1, the minute-level general control service module are used to initialize the transfer control information and averagely provide the transfer control information to the transfer service of a plurality of hosts, and then controls the progress of the data transfer time slices and the updating of the states, meanwhile, the minute-level general control service module can also implement the dispatching of transfer tasks and the reporting of the transfer process during the data transfer process by means of the configuration parameters. The time slice has the following meanings: in the data transfer system disclosed in the present invention, according to the configuration, a piece of time is manually divided into several small logic time pieces, each of which is a time slice. The configuration information includes: the transfer start time, the transfer time slice, the number of the times of updating current transfer end time in each cycle, the time interval between the transfer end time and the current system time, the database connection information, and the number of the hosts.

As shown in FIG. 1, the second-level general control service module is used to transfer the data which are generated during the preceding n (for example, n<10) seconds from the source data table into the target data table, that is, to assign the transfer task to the transfer service and to proceed the progress of the transfer time slice according to the information of the data transfer control table in the database, meanwhile, the second-level general control service module can also implement the dispatching of transfer tasks and the reporting of the transfer process during the data transfer process by means of the configuration parameters. The configuration information includes: the transfer start time, the transfer time slice, the number of the times of updating current transfer end time in each cycle, the time interval between the transfer end time and the current system time, the database connection information, and the number of the hosts.

Figure 2:
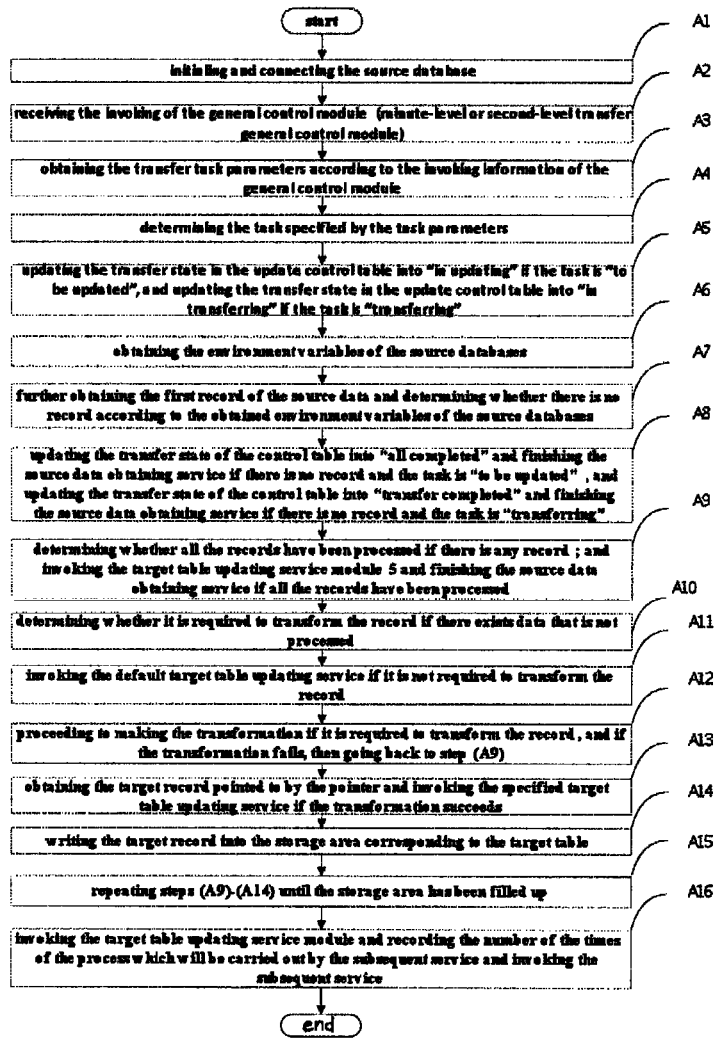
FIG. 2 is the work flow chart of the source data obtaining service module according to the embodiment of the present invention.

FIG. 2 is the work flow chart of a source data obtaining service module 4 according to the embodiment of the present invention. As shown in FIG. 2, the work flow of the source data obtaining service module 4 is as follows: (A1) initialing and connecting the source database $S_1$-$S_N$; (A2) receiving the invoking of the general control module 3 (minute-level or second-level transfer general control module); (A3) obtaining the transfer task parameters according to the invoking information of the general control module 3; (A4) determining the task specified by the task parameters; (A5) updating the transfer state in the update control table into "in updating" if the task is "to be updated", and updating the transfer state in the update control table into "in transferring" if the task is "transferring"; (A6) obtaining the environment variables of the source databases $S_1$-$S_N$; (A7) further obtaining the first record of the source data and determining whether there is no record according to the obtained environment variables of the source databases $S_1$-$S_N$; (A8) updating the transfer state of the control table into "all completed" and finishing the source data obtaining service if there is no record and the task is "to be updated", and updating the transfer state of the control table into "transfer completed" and finishing the source data obtaining service if there is no record and the task is "transferring"; (A9) determining whether all the records have been processed if there is any record; and invoking the target table updating service module 5 and finishing the source data obtaining service if all the records have been processed; (A10) determining whether it is required to transform the record if there exists data that is not processed; (A11) invoking the default target table updating service if it is not required to transform the record; (A12) proceeding to making the transformation if it is required to transform the record, and if the head pointer of the result set of the transformation is null (i.e., the transformation fails), then going back to step (A9); (A13) obtaining the target record pointed to by the pointer and invoking the specified target table updating service 5 if the head pointer of the result set of the transformation is not null (i.e., the transformation succeeds); (A14) writing the target record into the storage area corresponding to the target table; (A15) repeating steps (A9)-(A14) until the storage area has been filled up; (A16) invoking the target table updating service module 5 and recording the number of the times of the process which will be carried out by the subsequent service and invoking the subsequent service. Wherein, the transformation has the follow meanings: when the source data record is not consistent with the target data record, it is required to perform data conversion and target table locating, and the process of data conversion and target table locating is referred to as transformation.

The source data obtaining service module 4 includes the following sub-modules:

Initializing sub-module, for obtaining the parameter information, initializing the global control variables and the semaphore of the temporary data storage area, and setting the state information of the host group, etc.;

Source data selecting sub-module, for selecting the data to be transferred from the source data table;

Transformation sub-module, for performing the transformation by invoking an external transformation function;

Target table updating service determining sub-module, for determining the target updating service name, the keyword and the semaphore of the data storage in which the target locates, the keyword of the idle control message queue, etc., according to the target database and the target data table;

Writing data storage area sub-module, for writing the transformed data into a corresponding section in the corresponding data storage area (the data storage area corresponds to the task) under the protection of the semaphore such that said data can be read by the target table updating service sub-module, wherein when none of the memory sections is available, the sub-module can read the idle control message queue corresponding to the task in the manner of blocking, and after the message is read, the sub-module continues to find a free data storage area under the protection of the semaphore;

Invoking target table updating service sub-module, for creating an updating data storage area, and calculating the number of the times of the process which will be carried out by the subsequent service according to the result of the determination of the target table updating service determining sub-module, and write the target record into the temporary data storage area at the same time.

The source data obtaining service module 4 also includes an exception handling sub-module. When the initialization fails, the sub-module invokes a common error-reporting service and records a log. When the connection to the database fails, the sub-module will re-connect the database and record a log. When the data selection fails, the sub-module will re-obtain the source data, and if it remains failed for a specified number of times, the sub-module will skip this operation and records a log, as well as invoking the common error-reporting service at the same time. When the transformation fails, the sub-module will perform the transformation again, and if it remains failed for a specified number of times, the sub-module will skip this operation and records a log, and invoking the common error-reporting service at the same time. When writing the storage area fails, the sub-module will try to re-write it, and if it remains failed for a specified number times, the sub-module will skip this operation and records a log, and invoking the common error-reporting service at the same time.

The source data obtaining service module 4 receives the invoking of the general control module 3 (the minute-level or second-level general transfer control module), and complete the processes from the obtaining of the original data to the generation of the target data according to the invoking parameters, and invokes the target table updating service module. The source data obtaining service module can be divided into two parts: a main part and an affiliated part. The main part is used to read the parameters of the transfer task, load the affiliated part, and invoke the sub-function corresponding to the transfer task, thus eliminating the need for modifying the main part when the user uses it. The affiliated part is a dynamic function library, which packages a various of sub-operations such as task identification, original data obtaining, data transformation, and transfer task state information maintenance, etc., wherein the operations of obtaining various database environment variables and selecting data as well as transforming the data can be customized according to the user's requirements, such that the requirements of different users and/or different data tables and the requirements of data replication and drawer synchronization. The operation of data transformation is optional. That is, if the user does not have the requirement of filtering and transforming the data, the user just need to customize the operation of selecting the original data from the source database.

Figure 3:
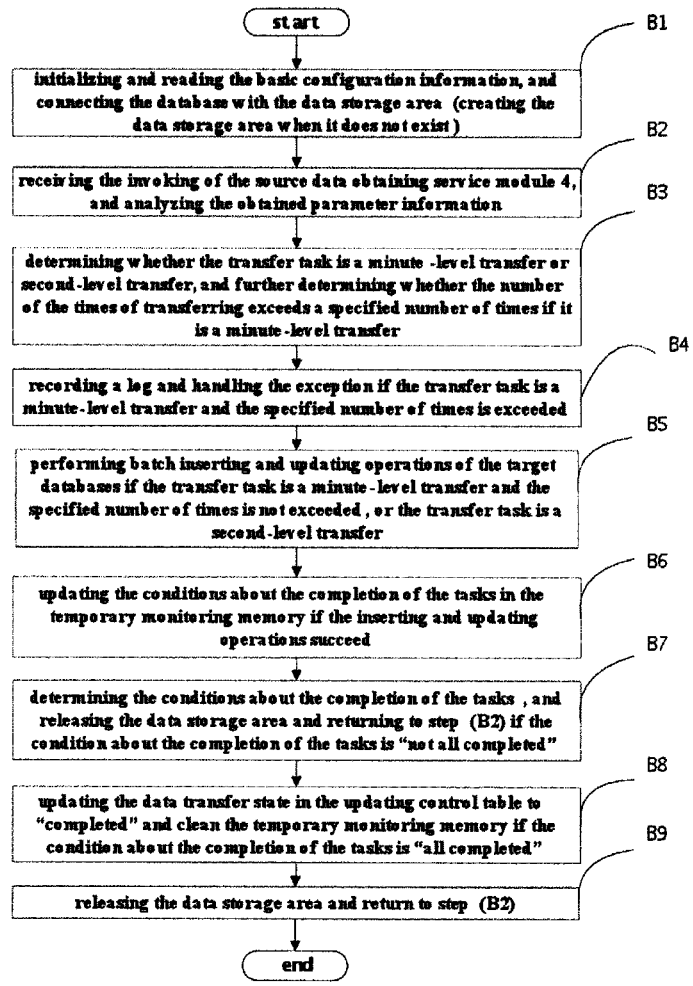
FIG. 3 is the work flow chart of the target table updating service module according to the embodiment of the present invention.

FIG. 3 is the work flow chart of the target table updating service module 5 according to the embodiment of the present invention. As shown in FIG. 3, the work flow of the target table updating service module is as follows: (B1) initializing and reading the basic configuration information, and connecting the database with the data storage area (creating the data storage area when it does not exist); (B2) receiving the invoking of the source data obtaining service module 4, and analyzing the obtained parameter information; (B3) determining whether the transfer task is a minute-level transfer or second-level transfer, and further determining whether the number of the times of transferring exceeds a specified number of times if it is a minute-level transfer; (B4) recording a log and handling the exception if the transfer task is a minute-level transfer and the specified number of times is exceeded; (B5) performing batch inserting and updating operations of the target databases $P_1$-$P_N$ if the transfer task is a minute-level transfer and the specified number of times is not exceeded, or the transfer task is a second-level transfer; (B6) updating the conditions about the completion of the tasks in the temporary monitoring memory if the inserting and updating operations succeed; (B7) determining the conditions about the completion of the tasks, and releasing the data storage area and returning to step (B2) if the condition about the completion of the tasks is "not all completed"; (B8) updating the data transfer state in the updating control table to "completed" and clean the temporary monitoring memory if the condition about the completion of the tasks is "all completed"; (B9) releasing the data storage area and return to step (B2).

The target table updating service module 5 includes the following sub-modules:

process initializing sub-module, which has the functions of initializing the data storage area and the semaphores, and connecting the target database with the control database;

main control process sub-module, which can obtain parameter information from the invoker (i.e., the source data obtaining service module 4) and analyze it, select data from the data storage area and invoke the batch database updating sub-module and the task state processing sub-module, so as to complete the tasks dispatched by the source data obtaining service module 4;

batch database updating sub-module, which can select data from the data storage area and update them into the target table in batches;

task state processing sub-module, which can update the processing state in the temporary data storage area and write the idle control message queue under the protection of the semaphores, and when all of the tasks are completed, it can update the transfer state of the corresponding time slice in the transfer state control table into "completed", and reorganizing the data storage area corresponding to the current task.

The target table updating service module 5 further comprises an exception handling sub-module, which performs discarding operation for invalid transfer parameters and records error messages, and when the connection of the databases encounters an exception, the sub-module will actively reconnect the databases, and will not perform subsequent processing until the connection succeeds. Meanwhile, when the database inserting/updating operations encounter any exception, for a second-level transfer, the exception will be ignored and the subsequent processing will directly be performed; and for a minute-level transfer, the number of the errors will be counted and a log will be recorded, and no inserting/updating operation will be performed repeatedly if the number exceeds a specified value.

The target table updating service module 5 receives the invoking of the source data obtaining service module 4 and then updates the target data into the target table, and updates the information about the transfer task so as to complete the current transfer task. The target table updating service module can be divided into a main part and an affiliated part. The main part is used to read the parameters of the transfer task, load the affiliated part, and invoke the sub-function corresponding to the transfer task, thus eliminating the need for modifying the main part when the user uses it. The affiliated part is dynamic function library, which packages various sub-processing such as task identification, inserting and updating of target data, and transfer task state information maintenance, and wherein the operations of obtaining the environment variables of each database and performing the inserting and updating of target data can be customized according to the user's requirements, such that requirements for different users and different data tables can be met.

In the target table updating service module 5, the inserting/updating process of the batch database updating sub-module is as follows: (C1) dividing the data to be inserted into blocks, and each block being able to store a plurality of pieces of data; (C2) each of a plurality of database operation processes reading one block of data at a time in an exclusive manner, and then inserting or updating the data into the target database in manner of batch inserting or batch updating; (C3) if step (C2) succeeds, then said processes continuing to process other blocks of data, and if step (C2) fails, then inserting or updating the data into the target database in manner of single inserting or updating, and recording an error log corresponding to the failure of the operation and continuing to process other blocks of data. Compared to the prior art, the inserting/updating process disclosed in the present invention combines the multi-process parallel processing with the batch inserting/updating technology, and thus it does not need a large log space, and at the same time allows submitting failure of individual process, thereby it can reduce the cost of the communication with the server side and improves the inserting speed in substance.

Figure 4:
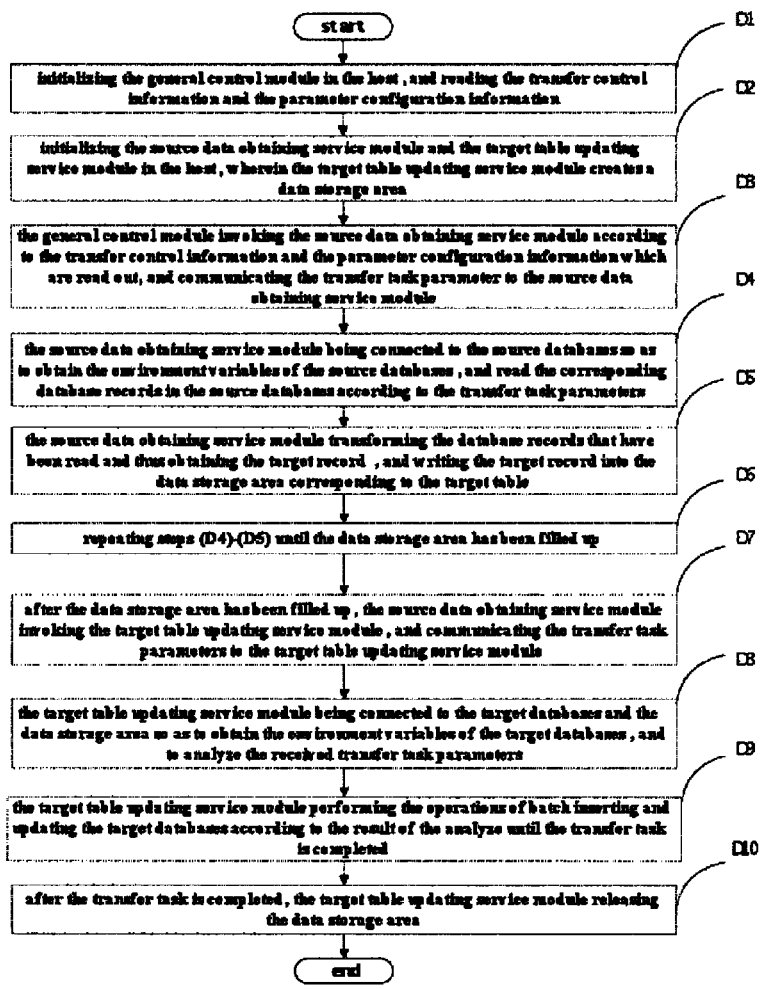
FIG. 4 is the flow chart of the data transfer method according to the embodiment of the present invention.

FIG. 4 is the flow chart of the data transfer method according to the embodiment of the present invention. As shown in FIG. 4, the data transfer method disclosed in the present invention comprises the following steps: (D1) initializing the general control module 3 in the host, and reading the transfer control information and the parameter configuration information; (D2) initializing the source data obtaining service module 4 and the target table updating service module 5 in the host, wherein the target table updating service module 5 creates a data storage area; (D3) the general control module 3 invoking the source data obtaining service module 4 according to the transfer control information and the parameter configuration information which are read out, and communicating the transfer task parameter to the source data obtaining service module 4; (D4) the source data obtaining service module 4 being connected to the source databases $S_1$-$S_N$ so as to obtain the environment variables of the source databases $S_1$-$S_N$, and read the corresponding database records in the source databases $S_1$-$S_N$ according to the transfer task parameters; (D5) the source data obtaining service module 4 transforming the database records that have been read and thus obtaining the target record, and writing the target record into the data storage area corresponding to the target table; (D6) repeating steps (D4)-(D5) until the data storage area has been filled up; (D7) after the data storage area has been filled up, the source data obtaining service module 4 invoking the target table updating service module 5, and communicating the transfer task parameters to the target table updating service module 5; (D8) the target table updating service module 5 being connected to the target databases $P_1$-$P_N$ and the data storage area so as to obtain the environment variables of the target databases $P_1$-$P_N$, and to analyze the received transfer task parameters; (D9) the target table updating service module 5 performing the operations of batch inserting and updating the target databases $P_1$-$P_N$ according to the result of the analyze until the transfer task is completed; (D10) after the transfer task is completed, the target table updating service module 5 releasing the data storage area.

In the data transfer method as disclosed in the present invention, the general control module 3 is a minute-level transfer general control module or a second-level transfer general control module. Wherein, the source data obtaining service module 4 can be divided into a main part and an affiliated part. The main part is used to read the parameters of the transfer task, load the affiliated part, and invoke the sub-function corresponding to the transfer task, thus eliminating the need for modifying the main part when the user uses it. The affiliated part is a dynamic function library, which packages various sub-operations such as task identification, original data obtaining, data transformation, and transfer task state information maintenance, etc., wherein the operations of obtaining various environment variables of each database, selecting data, and transforming data can be customized according to the user's requirements, such that the requirements of different users and/or different data tables and the requirements of data replication and drawer synchronization can be met. The operation of transforming data is optional. That is, if the user does not have the requirement of filtering and transforming the data, the user just need to customize the operation of selecting the original data from the source database.

Meanwhile, in the data transfer method as disclosed in the present invention, the target table updating service module 5 can also be divided into a main part and an affiliated part. The main part is used to read the parameters of the transfer task, load the affiliated part, and invoke the sub-function corresponding to the transfer task, thus eliminating the need for modifying the main part when the user uses it. The affiliated part is dynamic function library, which packages various sub-processing such as task identification, inserting and updating of target data, and transfer task state information maintenance, wherein the operations of obtaining the environment variables of each database and performing the operations of inserting and updating the target data can be customized according to the user's requirements, such that requirements for different users and different data tables can be met.

The step (D9) of the data transfer method as disclosed in the present invention further includes the following steps: (E1) dividing the data to be inserted into blocks, and each block being able to store a plurality pieces of data; (E2) each of a plurality of database operation processes reading one block of data at a time in an exclusive manner, and then inserting or updating the data into the target database $P_1$-$P_N$ in the manner of batch inserting or batch updating; (E3) if step (E2) succeeds, then said processes continuing to process other blocks of data, and if step (E2) fails, then inserting or updating the data into the target database in manner of single inserting or updating, and recording an error log corresponding to the failure of the operation and continuing to process other blocks of data.

Although the invention has been described in terms of the above preferred embodiments, the implements thereof are not limited to the above embodiments. It should be appreciated that various changes and modifications to the present invention can be made without departing from the spirit and scope of the present invention.

What is claimed is:

1. A data transfer system, comprising:
   a plurality of hosts, each including a general control module to control transfer tasks and load configuration parameters, a source data obtaining service module, and a target table updating service module,
   at least one source database connected to the hosts,
   a plurality of target databases connected to the hosts,
   a parameter configuration database connected to the hosts, and
   a control database connected to the hosts,
   wherein the target table updating service module receives an invoking of the source data obtaining service module and then inserts or updates target data into a target table of said plurality of target databases, and the target table updating service module is divided into a main part and an affiliated part,
   wherein the main part is used to read parameters of the transfer tasks, load the affiliated part, and invoke sub-processing corresponding to the transfer tasks, and
   wherein the affiliated part is a dynamic function library which packages target data inserting sub-processing and target data updating sub-processing,
   said system further comprising:
   a target table updating service determining sub-module for determining i) a target updating service name, ii) a keyword, iii) a semaphore of the data storage in which a respective one of the plurality of target databases is located, and iv) a keyword of an idle control message queue;
   wherein the plurality of target databases each have a corresponding target table, and the corresponding target data are heterogeneous,
   wherein the general control module includes a minute-level transfer general control module and a second-level transfer general control module, and the minute-level general control module and the second-level general control module are deployed separately such that when a minute-level transfer service is needed, the minute-level general control module is started, and when a second-level transfer service is needed, the second-level general control module is started, the minute-level general control service module is used to initialize transfer control information and provide the transfer control information to a transfer service of a plurality of hosts, and then control the progress of data transfer time slices and updating of state information, the minute-level general control service module dispatching of transfer tasks and reporting of the transfer process during the data transfer process by configuration parameters,
   wherein the source data obtaining service module includes the following sub-modules:
   an initializing sub-module, for obtaining the configuration parameters, initializing global control variables and a semaphore of a temporary data storage area, and setting the state information of a host group;
   a source data selecting sub-module, for selecting the data to be transferred from a source data table;
   a transformation sub-module, for performing a transformation by invoking an external transformation function;
   a writing data storage area sub-module, for writing the transformed data into a corresponding section in the corresponding data storage area under the protection of the semaphore such that said data is read by the target table updating service sub-module, wherein when none of the memory sections is available, the sub-module can reads the idle control message queue corresponding to the task in the manner of blocking, and after the message is read, the sub-module continues to find a free data storage area under the protection of the semaphore; and
   an invoking target table updating service sub-module, for creating an updating data storage area, and calculating the number of the times of the process which will be carried out by the subsequent service according to the result of the determination of the target table updating service determining sub-module, and write the target record into the temporary data storage area at the same time.

2. The data transfer system according to claim 1, wherein, the minute-level transfer general control module is used to carry out quasi real-time data transfer tasks, and the second-level transfer general control module is used to carry out real-time data transfer tasks.

3. The data transfer system according to claim 1, wherein, the target table updating service module further comprises a batch database updating sub-module, which performs the inserting and/or updating processes as follows:

(C1) dividing the data to be inserted into blocks, and each block for storing a plurality of pieces of data;

(C2) each of a plurality of database operation processes reading one block of data at a time in an exclusive manner, and inserting or updating the data into the target database in the manner of batch inserting or batch updating;

(C3) if step (C2) succeeds, then the processes continue to process other blocks of data, and if step (C2) fails, then inserting or updating the data into the target database in the manner of single inserting or updating, and recording an error log corresponding to the failure of the operation and continuing to process other blocks of data.

4. The data transfer system according to claim 1, wherein the general control module is deployed in each of the hosts, wherein only one of the hosts has task scheduling capability.

5. The data transfer system according to claim 1, wherein the source data obtaining service module comprises a transformation sub-module which carries out the transformation processing of the source data by invoking a dynamic transformation function, thereby generating the target data.

6. The data transfer system according to claim 1, wherein, the at least one source database and the at least one target database are heterogeneous.

7. The data transfer system according to claim 1, wherein, the parameter configuration database and the control database co-exist in the same database.

8. A data transfer method, comprising the following steps:

(D1) initializing a general control module in at least one of a plurality of hosts, and reading transfer control information and parameter configuration information;

(D2) initializing a source data obtaining service module and a target table updating service module in the at least one host, wherein the target table updating service module creates a data storage area;

(D3) the general control module invoking the source data obtaining service module according to the transfer control information and the parameter configuration information which is read, and communicating transfer task parameters to the source data obtaining service module;

(D4) the source data obtaining service module being connected to at least one source database so as to obtain the environment variables of the at least one source database, and to read corresponding database records in the source databases according to the transfer task parameters;

(D5) the source data obtaining service module transforming the database records that have been read to obtain a target record, and writing the target record into the data storage area;

(D6) repeating steps (D4)-(D5) until the data storage area has been filled up;

(D7) after the data storage area has been filled up, the source data obtaining service module invoking the target table updating service module, and communicating the transfer task parameters to the target table updating service module;

(D8) the target table updating service module being connected to a plurality of target databases and the data storage area so as to obtain the environment variables of the plurality of target databases, and to analyze the received transfer task parameters;

(D9) the target table updating service module performing the operations of batch inserting and updating the plurality of target databases according to the result of the analyze until the transfer task is completed;

(D10) after the transfer task is completed, the target table updating service module releasing the data storage area;

wherein the target table updating service module receives an invoking of the source data obtaining service module and then inserts or updates target data into a target table of said plurality of target database, and the target table updating service module is divided into a main part and an affiliated part, wherein the main part reads parameters of the transfer tasks, loads the affiliated part, and invokes sub-processing corresponding to the transfer tasks, and wherein the affiliated part is a dynamic function library which packages target data inserting sub-processing and target data updating sub-processing, wherein a target table updating service determining sub-module determines i) a target updating service name, ii) a keyword, iii) a semaphore of the data storage in which a respective one of the plurality of target databases is located, and iv) a keyword of an idle control message queue;

wherein the plurality of target databases each have a corresponding target table, and the corresponding target data are heterogeneous, wherein the general control module includes a minute-level transfer general control module and a second-level transfer general control module, and the minute-level general control module and the second-level general control module are deployed separately such that when a minute-level transfer service is needed, the minute-level general control module is started, and when a second-level transfer service is needed, the second-level general control module is started, the minute-level general control service module is used to initialize transfer control information and provide the transfer control information to a transfer service of a plurality of hosts, and then control the progress of data transfer time slices and updating of state information, the minute-level general control service module dispatching of transfer tasks and reporting of the transfer process during the data transfer process by the configuration parameters, wherein the source data obtaining service module includes the following sub-modules:

an initializing sub-module, for obtaining the configuration parameters, initializing global control variables and a semaphore of a temporary data storage area, and setting the state information of a host group;

a source data selecting sub-module, for selecting the data to be transferred from a source data table;

a transformation sub-module, for performing a transformation by invoking an external transformation function;

a writing data storage area sub-module, for writing the transformed data into a corresponding section in the corresponding data storage area under the protection of the semaphore such that said data is read by the target table updating service sub-module, wherein when none of the memory sections is available, the sub-module reads the idle control message queue corresponding to the task in the manner of blocking, and after the message is read, the sub-module continues to find a free data storage area under the protection of the semaphore; and an invoking target table updating service sub-module, for creating an updating data storage area, and calculating the number of the times of the process which will be carried out by the subsequent service according to the result of the determination of the target table updating service determining sub-module, and write the target record into the temporary data storage area at the same time.

9. The data transfer method according to claim 8, wherein step (D9) of the data transfer method further comprises the following steps:
(E1) dividing the data to be inserted into blocks, and each block being able to store a plurality of pieces of data;
(E2) each of a plurality of database operation processes reading one block of data at a time in an exclusive manner, and then inserting or updating the data into the at least one target databases in manner of batch inserting or batch updating;
(E3) if step (E2) succeeds, then the processes continue to process other blocks of data, and if step (E2) fails, then inserting or updating the data into the target database in the manner of single inserting or updating, and recording an error log corresponding to the failure of the operation and continuing to process other blocks of data.

10. The data transfer method according to claim 8, wherein the minute-level transfer general control module is used to carry out quasi real-time data transfer tasks, and the second-level transfer general control module is used to carry out real-time data transfer tasks.

11. The data transfer method according to claim 8, wherein the general control module is deployed in each of the hosts, wherein only one of the at least one hosts has task scheduling capability.

12. The data transfer method according to claim 8, wherein the source data obtaining service module comprises a transformation sub-module which carries out the transformation processing of the source data by invoking a dynamic transformation function, thereby generating the target data.

13. The data transfer method according to claim 8, wherein, the at least one source databases and the at least one target databases are heterogeneous.

* * * * *